United States Patent
Zhang

(10) Patent No.: US 7,135,878 B2
(45) Date of Patent: *Nov. 14, 2006

(54) BURN-IN APPARATUS FOR BURNING MAC ADDRESS

(75) Inventor: Su Shun Zhang, Shenzhen (CN)

(73) Assignees: Hong Fu Jin Precision Industry (Shenzhen) Co., Ltd., Shenzhen (CN); Hon Hai Precision Industry Co., Ltd., Tu-Cheng (TW)

( * ) Notice: Subject to any disclaimer, the term of this patent is extended or adjusted under 35 U.S.C. 154(b) by 0 days.

This patent is subject to a terminal disclaimer.

(21) Appl. No.: 10/997,122

(22) Filed: Nov. 24, 2004

(65) Prior Publication Data
US 2005/0141296 A1    Jun. 30, 2005

(30) Foreign Application Priority Data
Dec. 26, 2003   (TW) .............................. 92137039 A

(51) Int. Cl.
*G01R 31/02* (2006.01)
(52) U.S. Cl. ..................................... 324/760; 324/765
(58) Field of Classification Search ........ 324/760–765; 702/118; 370/241, 338, 395; 714/712, 724, 714/733
See application file for complete search history.

(56) References Cited

U.S. PATENT DOCUMENTS

| | | |
|---|---|---|
| 5,798,653 A | 8/1998 | Leung, Jr. |
| 6,181,146 B1 | 1/2001 | Koyama |
| 6,363,423 B1 * | 3/2002 | Chiles et al. ............... 709/224 |
| 2005/0141521 A1 * | 6/2005 | Li et al. ................. 370/395.54 |

* cited by examiner

*Primary Examiner*—Vinh P. Nguyen
(74) *Attorney, Agent, or Firm*—Wei Te Chung

(57) ABSTRACT

A burn-in apparatus for burning MAC address stored a burning machine (100) onto an IC (302), which includes an isolation circuit (220), a voltage switching circuit (230) and a power switching circuit (240). The burning machine, the isolation circuit, the voltage switching circuit, and power switching circuit are serially connected and form a data transportation channel. The MAC address is transferred to the IC through the data transportation channel. The isolation circuit prevents interference between the burning machine and the IC. The voltage switching circuit supplies a high voltage to receive data for the IC to be burned. The power switching circuit supplies a working voltage for the IC. Finishing of the burning, MAC address returns to the burning machine through the data transportation channel.

18 Claims, 4 Drawing Sheets

US 7,135,878 B2

BURN-IN APPARATUS FOR BURNING MAC ADDRESS

BACKGROUND OF THE INVENTION

1. Field of the Invention

The present invention relates to a burn-in apparatus, and particularly to a burn-in apparatus for burning a media access control (MAC) address which has simple configuration and reduces the time of burning and checks the result of burning.

2. Description of the Related Art

A network card has two types of address, one is IP address, the other is MAC address, i.e., physical address. This is a sole mark of a network card. Wherever a network card is connected, the MAC address is unchanged. The length of MAC address is 48 bits of binary digit, which is composed of twelve 00-FFH hexadecimal digits, and a symbol "-" is placed between every two digits.

When a network card is assembled to Ethernet, a MAC address that was assigned to the network card in manufacturing process is required. The address is burned to EPROM of network card in manufacturing process.

With the develop of diversification of computer and the need reducing cost, a current motherboard is associated with a network card. In manufacturing process of a motherboard, main integrated circuit (IC) chipsets are mounted to the motherboard by surface mounting machines. A typical way is using integrated circuit test (ICT) machine to burn the MAC address to the network card. However, when burning using said machine, it will take a long time to test electric performance before burning, and it causes cumulus of motherboards in product line. Another means to burn a MAC address is using a burning device. An example of this means is disclosed in Taiwan patent application No. 90223729. The burning device comprises a burning unit. An IC to be burned must be assembled to the burning unit. However said burning device can only burn ICs before they are assembled to the motherboards. ICs such as EPROM of network adaptor cards which are already assembled to the motherboards will not be burned by such burning devices.

Thus, an improved apparatus for burning MAC address which overcomes the above-mentioned problems is desired.

BRIEF SUMMARY OF THE INVENTION

Accordingly, an object of the present invention is to provide a burn-in apparatus which has simple configuration.

Another object of the present invention is to provide a burn-in apparatus which reduces burning time.

Still another object of the present invention is to provide a burn-in apparatus which checks burning data.

To achieve the above-mentioned objects, a burn-in apparatus in accordance with a preferred embodiment of the present invention comprises an isolation circuit, a voltage switching circuit and a power switching circuit. A burning machine, the isolation circuit, the voltage switching circuit, and power switching circuit are serially connected and form a data transportation channel. The MAC address is transferred to the IC to be burned through the data transportation channel. The isolation circuit prevents interference between the burning machine and the IC. The voltage switching circuit supplies a high voltage to receive data for the IC. The power switching circuit supplies a working voltage for the IC. After the finish of burning, MAC address transfers to the burning machine through the data transportation channel.

Other objects, advantages and novel features of the present invention will become more apparent from the following detailed description when taken in conjunction with the accompanying drawing, in which:

DETAILED DESCRIPTION OF THE INVENTION

Figure 1:
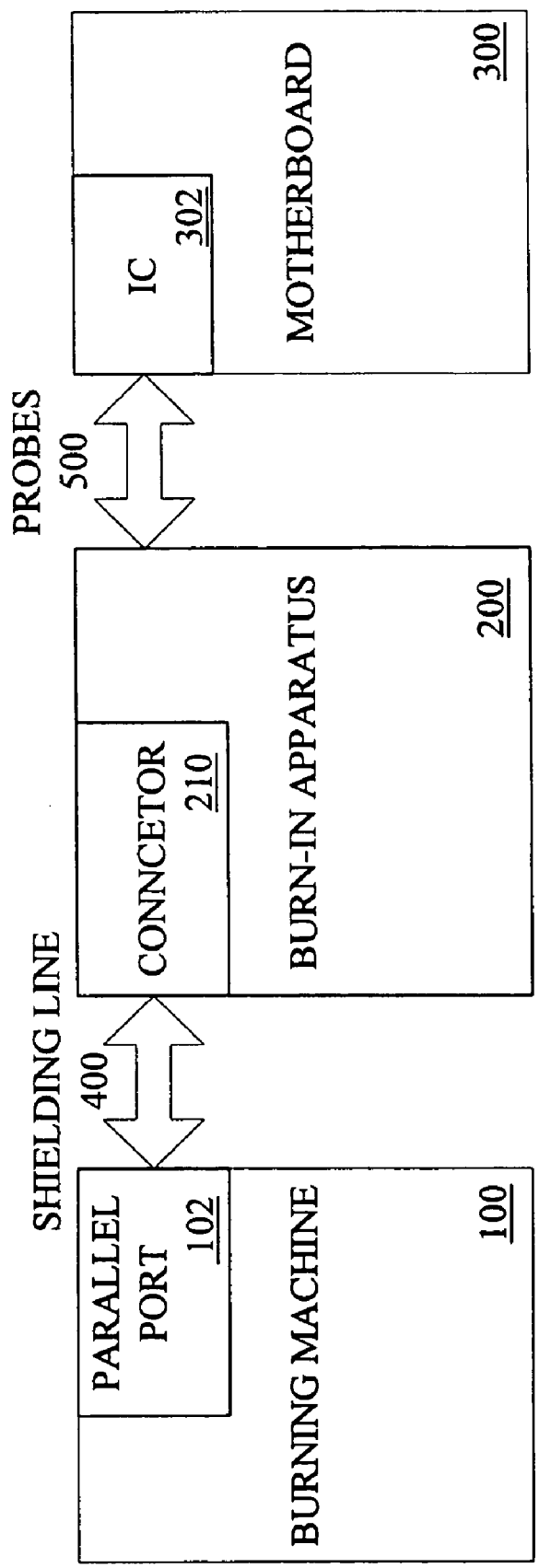
FIG. 1 is a schematic diagram of main constitution of an apparatus for burning MAC address in system in accordance with the preferred embodiment of the present invention.

Referring to FIG. 1, a burn-in apparatus 200 in accordance with the preferred embodiment of the present invention lies in a burn-in system of MAC address. The system further comprises a burning machine 100 and a motherboard 300. In this embodiment, the burning machine 100 is a computer, including a burning platform (not shown) on which the motherboard 300 can be laid. A parallel port 102 of the burning machine 100 connects with a connector 210 of the burn-in apparatus 200 through a shielding line 400. The motherboard 300 comprises an IC 302 that is EPROM of a network card. The IC 302 connects with the burn-in apparatus 200 through probes 500.

Figure 2:
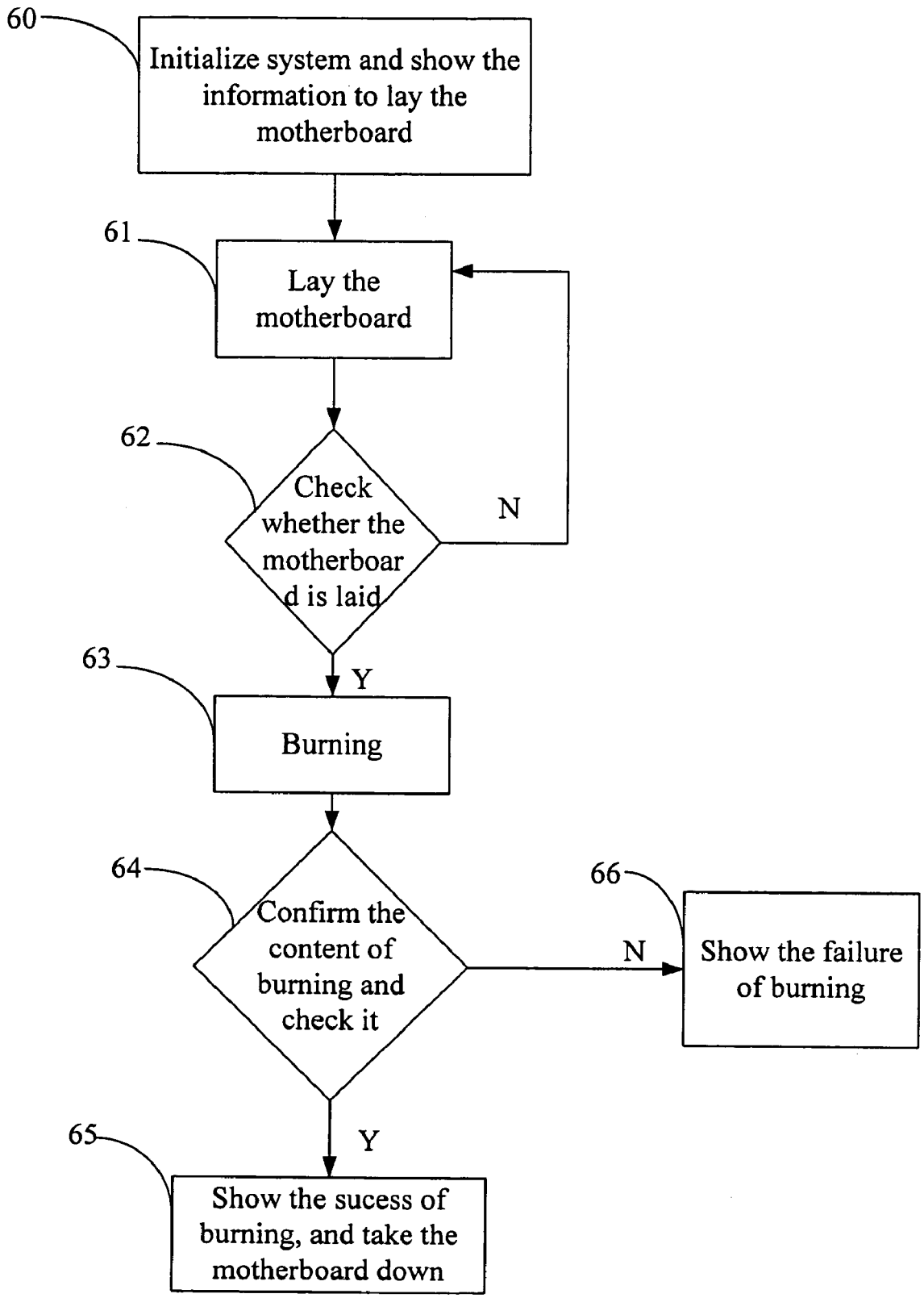
FIG. 2 is a flow chart showing the working of a burn-in apparatus.

Referring to FIG. 2, the process of burning MAC address comprises the following steps:

Step 60: Startup the burning machine 100, the system of the burning machine 100 is initialized and the information to lay the motherboard 300 is showed;

Step 61: Lay the motherboard 300 onto the burning platform of the burning machine 100;

Step 62: Check whether the motherboard 300 is assembled with probes 500, if yes, the system will enter the burning program, if no, the system will return to step 61;

Step 63: Show the information to be burned, when press the burning switch, system enters the burning program;

Step 64: System can check whether burning is successful, i.e. whether MAC address is loaded to the IC 302;

Step 65: System that checks MAC address in the IC 302 shows the success of burning, then take the motherboard 300 down;

Step 66: System that doesn't check MAC address in the IC 302 shows the failure of burning, then burn the IC 302 again.

Figure 3:
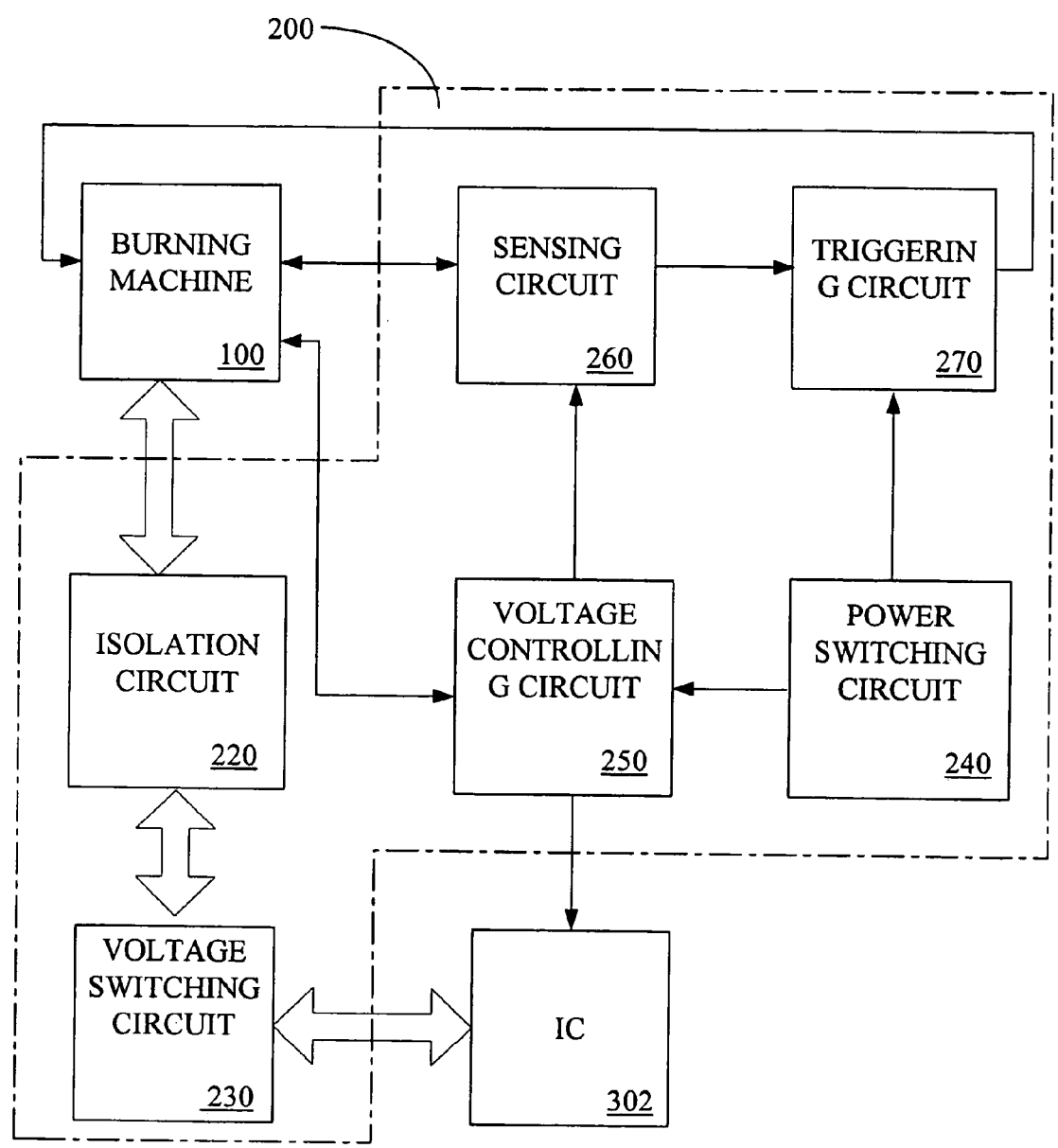
FIG. 3 shows a working principle of a burn-in apparatus.

Referring also to FIG. 3, the burn-in apparatus comprises an isolation circuit 220, a voltage switching circuit 230, a power switching circuit 240, a voltage controlling circuit 250, a sensing circuit 260 and a triggering circuit 270 for burning. The burning machine 100, the isolation circuit 220, the voltage switching circuit 230, and the IC 302 are serially connected and form a data transportation channel. The MAC address stored in the burning machine 100 is transmitted to the IC 302 through the data transportation channel. The burning machine 100, the sensing circuit 260, and the triggering circuit 270 for burning are serially connected and form a loop that senses whether the motherboard 300 is laid onto the platform of the burning machine 100, and confirms running of the burning program. The power switching circuit 240 respectively connects with the voltage controlling circuit 250, the sensing circuit 260, and the triggering circuit 270, and supplies 3.3 volts working voltage for the above-mentioned circuits. One port of the voltage controlling circuit 250 connects with the burning machine 100, and the other port connects with the IC 302. The voltage controlling circuit 250 receives the controlling instructions from the burning machine 100 and supplies 3.3 volts voltage for the IC 302.

The principle of the burn-in apparatus is introduced as follows. The burning machine 100 starts up and is initialized, which supplies a signal for the sensing circuit 260, synchronously the power switching circuit 240 supplies working voltage for the sensing circuit 260. The sensing circuit 260 starts up and checks whether the motherboard 300 is already laid onto the platform of the burning machine 100. If laid, the system enters the triggering circuit 270 for burning. Subsequently the triggering circuit 270 for burning sends a signal to the burning machine 100, and the burning machine 100 sends a signal to the voltage controlling circuit 250. The voltage controlling circuit 250 transports the voltage that the power switching circuit supplies to the IC 302 and sends a feedback signal to the burning machine 100. After the burning machine 100 receives the feedback signal, MAC address is transported to the IC 302 through the data transportation channel, simultaneously, the voltage switching circuit 230 supplies a high voltage received MAC address for the IC 302, and the IC 302 is burned. After burned, MAC address burned to the IC 302 is transported to the burning machine 100 to be checked through the data transportation channel. The burning machine 100 checks whether the burning result is correct, if false, MAC address will be burned again according to the above-mentioned process.

Figure 4:
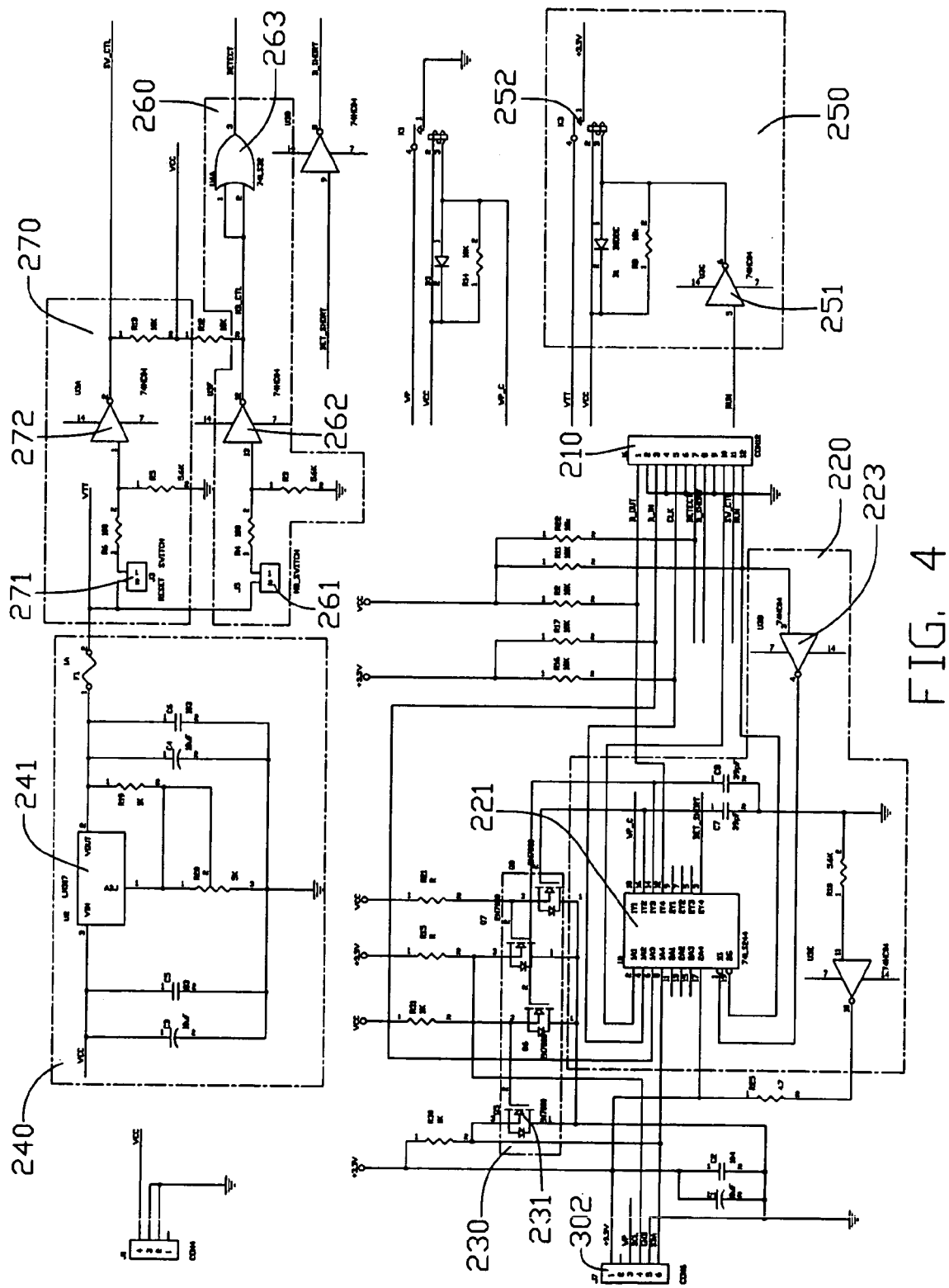
FIG. 4 is a circuit diagram of a burn-in apparatus.

Referring also to FIG. 4, the isolation circuit 220 comprises a buffer 221 (74LS244). One enabled port 1G of the buffer 221 connects with the twelfth pin of the connector 210 with an inverter 223, the other enabled port 2G directly connects with the twelfth pin of the connector 210. The third pin (D_IN) of the connector 210 connects with the sixth pin (1A3) of the buffer 221, and the fourteenth pin (1Y3) of the buffer 221 connects with the voltage switching circuit 230, and the twelfth pin of the buffer 221 connects with the first pin (D_OUT) of the connector 210. MAC address from the burning machine 100 transports the isolation circuit 220 to isolate through the connector 210. The voltage switching circuit 230 comprises a plurality of transistor 231 (2N700) and supplies the high voltage receiving the data for the IC 302. The power switching circuit 240 comprises a voltage output regulator 241 (LM317) and changes 5 volts voltage to 3.3 volts voltage that the voltage controlling circuit 250, the sensing circuit 260 and triggering circuit 270 for burning need. The voltage controlling circuit 250 comprises a inverter 251 and a relay 252, when output signal of the twelfth pin (RUN) of the connector 210 is available, the relay 252 is running, here the voltage controlling circuit 250 yields 3.3 volts to the IC to be burned 302. The sensing circuit 260 comprises a startup switch 261, an inverter 262, and an OR gate 263, the output of the OR gate 263 connects with the seventh pin of the connector 210 to detect whether the motherboard 300 is laid onto the platform of the burning machine 100. The triggering circuit 270 for burning comprises a burning switch 271 and an inverter 272. Push the burning switch 271 to produce an output signal, and the output signal is transported to the eleventh pin of the connector 210 through the inverter 272. The burning machine 100 receives the output signal and sends a controlling signal to the voltage controlling circuit 250 through the twelfth pin of the connector 210, and the controlling signal triggers the enable ports 1G and 2G, and MAC address from the burning machine 100 is transported to the sixth pin of the buffer 221 through the third pin of the connector 210. The output of the sixth pin of the buffer 221 is transported to the sixth pin of the IC 302, and the burning is accomplished. After the finish of the burning, MAC address returns to the eighth pin of the buffer 221, and the output is transported to the first pin of the connector 210 through the twelfth pin of the buffer 221, finally MAC address gets to the burning machine 100 to check.

It is to be understood, however, that even though numerous characteristics and advantages of the present invention have been set forth in the foregoing description, together with details of the structure and function of the invention, the disclosure is illustrative only, and changes may be made in detail, especially in matters of type, arrangement of components within the principles of the invention to the full extent indicated by general meaning of the terms in which the appended claims are expressed.

What is claimed is:

1. A burn-in apparatus for burning MAC address stored in a burning machine to an IC, the burn-in apparatus comprising:
   an isolation circuit that prevents interference between the burning machine and the IC;
   a voltage switching circuit supplying a high voltage which is needed to receive data for the IC; and
   a power switching circuit that supplies a working voltage for the IC;
   wherein the isolation circuit and the voltage switching circuit are serially connected and form a data transportation channel, after finishing burning, MAC address returns to the burning machine to check through the data transportation channel.

2. The burn-in apparatus as described in claim 1, further comprising a voltage controlling circuit between the power switching circuit and the IC, and the voltage controlling circuit connects with the burning machine.

3. The burn-in apparatus as described in claim 2, wherein the voltage controlling circuit comprises an inverter and a relay, and the inverter connects with the relay.

4. The burn-in apparatus as described in claim 1, wherein one port of the burning machine serially connects with a sensing circuit and a triggering circuit, and the burning machine, the sensing circuit, and the triggering circuit form a loop.

5. The burn-in apparatus as described in claim 4, wherein the power switching circuit connects with the sensing circuit and the triggering circuit and supplies a working voltage for the sensing circuit and the triggering circuit.

6. The burn-in apparatus as described in claim 4, wherein the sensing circuit comprises a startup switch, a inverter and an OR gate, and one port of the startup switch connects with the power switching circuit, and the other port connects with the inverter and the or gate.

7. The burn-in apparatus as described in claim 4, wherein the triggering circuit comprises a burning switch and an inverter, and one port of the burning switch connects with the power switching circuit, and the other port connects with the inverter.

8. The burn-in apparatus as described in claim 1, wherein the isolation circuit comprises a buffer.

9. The burn-in apparatus as described in claim 1, wherein the voltage switching circuit comprises a plurality of transistors.

10. The burn-in apparatus as described in claim 1, wherein the power switching circuit comprises a voltage output regulator.

11. A burn-in system for burning MAC address comprising:
   a burning machine storing MAC address;
   an IC to be burned;
   a burn-in apparatus for burning MAC address;
   a shielding line for connecting with the burning machine and the burn-in apparatus;
   a plurality of probes for connecting with the burn-in apparatus and the IC to be burned.

12. The burn-in system as described in claim 11, wherein the burning machine is a computer.

13. The burn-in system as described in claim 11, wherein the IC is an EPROM of a network card.

14. The burn-in system as described in claim 11, wherein the burn-in apparatus comprises an isolation circuit, voltage switching circuit, and power switching circuit for supplying a working voltage for the IC, and the isolation circuit and the voltage switching circuit are serially connected and form an data transportation channel.

15. The burn-in system as described in claim 14, wherein there is a voltage control circuit between the burning machine and the power switching circuit.

16. The burn-in system as described in claim 15, wherein the burn-in apparatus further comprises a sensing circuit and a triggering circuit, and the sensing circuit, the triggering circuit, and the burning machine form a loop, and the power switching circuit connects with the sensing circuit and the triggering circuit and supplies voltage for them.

17. The burn-in system as described in claim 14, wherein the voltage switching circuit are connected to the IC, and supplies a high voltage received MAC address for the IC.

18. A method of burning MAC address to an IC already mounted on a mother board, comprising steps of:
   providing a burning machine;
   providing an isolation circuit that prevents interference between the burning machine and the IC;
   providing a voltage switching circuit supplying a high voltage, which is needed to receive data for the IC; and
   providing a power switching circuit that supplies a working voltage for the IC; wherein
   the isolation circuit, and the voltage switching circuit, are connected to form a data transportation channel.

* * * * *